United States Patent [19]

Pakull et al.

[11] Patent Number: 4,985,532
[45] Date of Patent: Jan. 15, 1991

[54] THERMOTROPIC POLYESTERS, A PROCESS FOR THEIR PRODUCTION AND THEIR USE FOR THE PRODUCTION OF MOLDINGS, FILAMENTS AND FILMS

[75] Inventors: Ralf Pakull; Dieter Freitag; Volker Eckhardt; Karsten-Josef Idel, all of Krefeld; Uwe Westeppe, Mettmann, all of Fed. Rep. of Germany

[73] Assignee: Bayer Aktiengesellschaft, Leverkusen, Fed. Rep. of Germany

[21] Appl. No.: 448,351

[22] Filed: Dec. 11, 1989

[30] Foreign Application Priority Data

Dec. 23, 1988 [DE] Fed. Rep. of Germany ....... 3843559
Apr. 24, 1989 [DE] Fed. Rep. of Germany ....... 3913403

[51] Int. Cl.$^5$ ..................... C08G 63/02; C08G 63/00
[52] U.S. Cl. ..................... 528/190; 528/176; 528/191; 528/193; 528/271; 528/272
[58] Field of Search ............... 528/176, 193, 271, 272, 528/190, 191

[56] References Cited

U.S. PATENT DOCUMENTS 4,576,996 3/1986 Mark et al. ........................... 528/193
4,904,755 2/1990 Machell et al. ...................... 528/193

Primary Examiner—Harold D. Anderson
Assistant Examiner—T. Mosley
Attorney, Agent, or Firm—Connolly and Hutz

[57] ABSTRACT

The new thermotropic polyesters containing recurring structural units corresponding to the following formulae

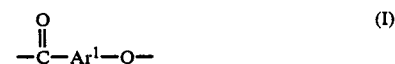

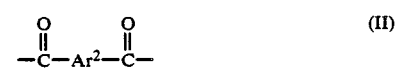

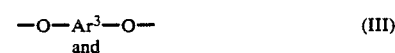

and

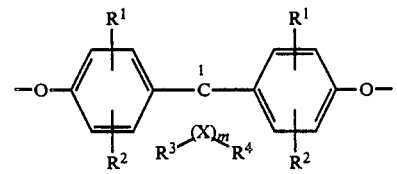

show excellent mechanical properties and good processibility. They may be used in the usual way for the production of moldings, filaments, fibers and films.

5 Claims, No Drawings

THERMOTROPIC POLYESTERS, A PROCESS FOR THEIR PRODUCTION AND THEIR USE FOR THE PRODUCTION OF MOLDINGS, FILAMENTS AND FILMS

This invention relates to high molecular weight, thermotropic polyesters having excellent mechanical properties and good processibility, to a process for their production and to their use for the production of moldings, filaments, fibers and films.

Substances which form liquid crystalline melts are called "thermotropic". Thermotropic polyesters are already known. A review of the relevant literature can be found, for example, in DE-OS No. 33 25 787 and EP-OS No. 134 959, where an investigation into the liquid crystalline state of the polymer melts is also described.

Moldings of all kinds and films can be produced from thermoplastic polyesters by thermoforming while filaments and fibers having outstanding mechanical properties can be produced from them by melt spinning. However, the polyesters have to be able to be processed in the melt, i.e. they have to be able to be melted without decomposing.

The most simple fully aromatic polyesters, such as poly-(4-hydroxybenzoate) and poly-(1,4-phenylene terephthalate), do not meet this requirement. They only melt with decomposition at 600° C.

EP-A No. 88 742 describes high molecular weight polyesters based on 4-hydroxybenzoic acid, isophthalic acid, hydroquinone and small quantities (<5 mol-%) 2,2-bis-(4-hydroxyphenyl)-propane. These polyesters show thermotropic properties by virtue of the components used. Their glass transition temperature is 60° to 80° C. higher than that of polyesters based on 4-hydroxybenzoic acid, so that they show improved heat resistance. The disadvantage is that, where they contain more than 5 mol-% 2,2-bis-(4-hydroxy-phenyl)-propane, these polyesters lose their liquid crystalline character.

Accordingly, the problem addressed by the present invention is to provide thermotropic polyesters which have high glass transition temperatures and high heat resistance coupled with low melting points and, hence, good processing properties and which retain the favorable mechanical properties typical of liquid crystalline materials.

It has now been found that thermotropic polyesters containing co-condensed residues of new bisphenols show this desired combination of advantageous properties.

Accordingly, the present invention relates to thermotropic aromatic polyesters containing recurring units corresponding to the following formulae

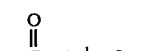  (I)

  (II)

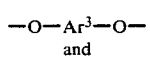  (III)
and

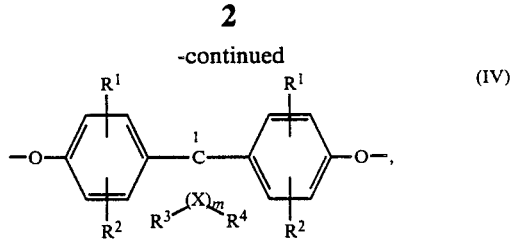

in which
Ar$^1$, Ar$^2$ and Ar$^3$ represent difunctional aromatic radicals containing 6 to 18 carbon atoms, these radicals optionally being substituted by 1 to 4 C$_{1-4}$ alkyl groups, preferably methyl, 1 to 4 C$_{1-4}$ alkoxy groups, preferably methoxy, and/or by 1 to 4 halogen atoms, preferably chlorine or bromine, and R$^1$ and R$^2$ independently of one another represent hydrogen, halogen, preferably chlorine and bromine, C$_{1-8}$ alkyl, preferably methyl, ethyl, propyl and butyl, C$_{5-6}$ cycloalkyl, preferably cyclohexyl, C$_{6-10}$ aryl, preferably phenyl and naphthyl, and C$_{7-12}$ aralkyl, preferably benzyl, m is an integer of 4 to 7, preferably 4 and 5, R$^3$ and R$^4$ may be individually selected for each X and, independently of one another, represent hydrogen or C$_1$-C$_6$ alkyl and X represents carbon,
with the proviso that at least one ring carbon atom is substituted simultaneously by two C$_{1-6}$ alkyl radicals, the molar ratio of the recurring units (I):(II) being 20 to 85:80 to 15 and preferably 50 to 80:20 to 50, the molar ratio (II):(III) and (IV) being 1 to 0.95:1 to 1.05, preferably 1 to 0.98:1 to 1.02 and more preferably 1.0:1.0 and the molar ratio (III):(IV) being 20 to 98:80 to 2, preferably 25 to 95:75 to 5 and more preferably 30 to 70:70 to 30.

The structural units corresponding to formula (IV) are derived in particular from the following dihydroxydiphenyl cycloalkanes (see for example formulae (V) to (VII):

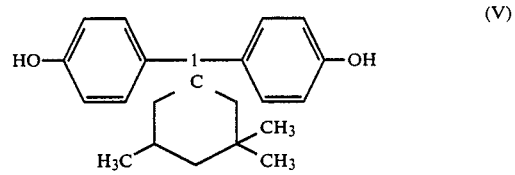

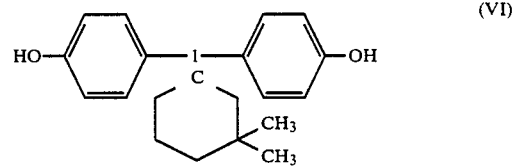

and

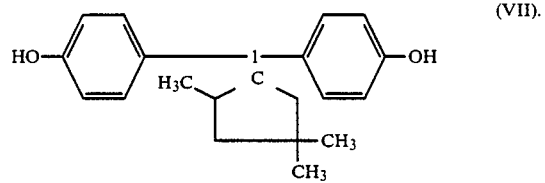

1,1-Bis-(4-hydroxyphenyl)-3,3-dimethyl cyclopentane is also mentioned.

The dihydroxydiphenyl cycloalkanes on which the structural units (IV) are based may be prepared in known manner by condensation of the corresponding phenols with the corresponding ketones in the presence of acidic catalysts and, optionally, other co-catalysts, cf. German patent application No. P 38 32 396.6 and Schnell, Chemistry and Physics of Polycarbonates, Interscience Publishers, New York 1964.

Hydroxycarboxylic acids which lead to units corresponding to formula (I) are, for example, 4-hydroxybenzoic acid, 6-hydroxy-2-naphthoic acid, 4-hydroxy-1-naphthoic acid, 5-hydroxy-1-naphthoic acid, 4,-hydroxy-4-biphenyl carboxylic acid, 4-hydroxytranscinnamic acid, 3-chloro-4-hydroxybenzoic acid, 3-methyl-4-hydroxybenzoic acid, 3-phenyl-4-hydroxybenzoic acid, 3-methoxy-4-hydroxybenzoic acid and/or 3-methoxy-4-hydroxycinnamic acid. 4-Hydroxybenzoic acid is preferred.

Examples of aromatic dicarboxylic acids which lead to units corresponding to formula (II) are isophthalic acid, terephthalic acid, 2,6-naphthalene dicarboxylic acid, 1,4-naphthalene dicarboxylic acid, 1,5-naphthalene dicarboxylic acid, 4,4'-biphenyl dicarboxylic acid, 4,4''-terphenyl dicarboxylic acid, 4,4'-trans-stilbene dicarboxylic acid, 4,4'-tolane dicarboxylic acid, 4,4'-azobenzene dicarboxylic acid, methyl terephthalic acid, chloroterephthalic acid, phenyl terephthalic acid, methyl isoterephthalic acid, chloroisoterephthalic acid and/or phenyl isoterephthalic acid. Terephthalic acid and/or isophthalic acid are preferred.

Examples of diphenols which lead to units corresponding to formula (III) are hydroquinone, resorcinol, 4,4'-dihydroxydiphenyl, 4,4'-dihydroxydiphenyl ether, 4,4'-dihydroxydiphenyl sulfide and/or 4,4'-dihydroxybenzophenone. Hydroquinone and/or 4,4'-dihydroxydiphenyl are preferred.

The particularly preferred diphenol corresponding to general formula (IV) is 1,1-bis-(4-hydroxyphenyl)-3,3,5-trimethyl cyclohexane.

The polyesters according to the invention may contain mixtures of the above-described recurring units corresponding to formula (IV). However, polyesters containing only one of the components mentioned are preferred.

Where hydroxycarboxylic acids, dicarboxylic acids and diphenols leading to the radicals $Ar^1$, $Ar^2$ or $Ar^3$, in which the chain-extending bonds are angled, are used, the quantities in which they are used will not exceed the limit at which the thermotropic properties of the resulting polyesters are lost.

The polyesters according to the invention may contain —COOH, OH, —$OC_6H_5$, acyloxy or residues of chain terminators as terminal groups. Preferred chain terminators are monofunctional aromatic hydroxyl compounds, such as 4-hydroxydiphenyl, p-nonyl-phenol, 4'-(1,1,3,3-tetramethylbutyl)-phenol and β-naphthol, and aromatic monocarboxylic acids, such as benzoic acid, diphenyl carboxylic acids and naphthalene carboxylic acids. The chain terminators may be used in quantities of from about 0.5 to 5 mol-%, based on diphenols in the case of monohydroxyl compounds and on dicarboxylic acids in the case of monocarboxylic acids.

It is also possible to use branched, trifunctional or higher, preferably aromatic, monomers in quantities of from about 0.1 to 1 mol-%, based on the sum total of components I and II, such as phloroglucinol, 1,3,5-benzene tricarboxylic acid and/or 3,5-dihydroxybenzoic acid.

The polyesters according to the invention may contain up to 10 mol-% carbonate groups, based on the sum total of ester and carbonate groups.

The polyesters according to the invention may contain the residues I to IV in statistical distribution, in segments or in blocks. In the case of component I, it is important to bear in mind that relatively long blocks can greatly increase the melting point and the viscosity of the polyesters.

The melt viscosity of the polyesters according to the invention, as measured above the DSC transition temperature from the crystalline to the liquid crystalline phase (normally between 200° to 350° C.) using a nozzle with a length-to-diameter ratio of 20 at a shear rate of $10^3 s^{-1}$, is generally in the range from 2 to 2,000, preferably in the range from 5 to 1,000 and, more preferably, in the range from 10 to 500 Pa.s.

The polyesters according to the invention may be prepared in known manner by reaction of the diphenols or reactive derivatives thereof, for example, $C_{1-3}$ acyl derivatives, with the carboxylic acids or reactive derivatives thereof, for example diesters or dihalides, optionally in the presence of branching agents, chain terminators and/or catalysts.

The preferred synthesis process is the reaction of the phenyl esters, which may even be prepared in situ, and the aromatic carboxylic acids with the diphenols at temperatures in the range from about 160° to 400° C. using a catalyst normally used for such reactions, optionally under reduced pressure.

Carbonate groups may be introduced by using diphenyl carbonate.

The polyesters according to the invention may be prepared at temperatures in the range from about 160° to 400° C., the reaction generally being started at a low temperature and the temperature being continuously increased as the reaction progresses. If the reaction velocity decreases, a vacuum may be applied, the pressure preferably being reduced from normal pressure to around 0.1 mbar.

The product obtained may be subjected to post-condensation in the solid phase, preferably under reduced pressure, at a temperature in the range from 220° to 380° C. After about 2 to 25 hours, the molecular weight has distinctly increased so that the resulting polyesters show further improved properties.

The starting compounds are generally used in such quantities that the ratio of carboxyl to hydroxy functions is 1:0.95 to 1.05, preferably 1:0.98 to 1.02 and, more preferably, 1:1.

The reactions may be carried out in the melt or in inert high-boiling solvents.

The catalysts for the polycondensation reaction are known and are described, for example, in DE-OS No. 3 535 452 and EP-OS No. 221 316.

Magnesium, manganese, sodium, potassium and/or zinc acetate, titanium tetrabutylate, titanium tetrapropylate and also sodium phenolate are preferably used as catalysts for the polycondensation reaction. The catalysts are used in quantities of from about 0.001 to 1% by weight and more preferably in quantities of from 0.1 to 0.2% by weight, based on the total weight of the monomer units used.

By virtue of their relatively low melt viscosity, the thermotropic polyesters according to the invention may be thermoformed to injection-molded parts, filaments, fibers, tapes and films. Shear forces occurring during processing bring about a molecular orientation which is largely influenced by the strength of those forces. In addition, they show pronounced pseudoplasticity, i.e. there is a considerable fall in melt viscosity with increasing shear forces. Suitable processing techniques are injection molding, extrusion, press-molding and melt spinning.

Moldings of high tensile strength, high heat resistance and high dimensional stability can be produced from the polyesters according to the invention. Since the polyesters according to the invention are highly resistant to chemicals, they are particularly suitable for the production of electrical articles, such as insulators, printed circuits, plugs, armature parts and encapsulations of integrated circuits, parts of chemical engineering equipment, such as pipes, vessel linings, rotors, plain bearings and seals, parts for the interior trim of aircraft, parts of medical equipment.

However, the polyesters according to the invention may also be used in powder form or in dispersion as coating compositions and coating materials. They are also eminently suitable for the production of reinforced or filled molding compounds having a reinforcing material or filler content of from about 5 to 65% by weight, based on the reinforced or filled molding compound.

Accordingly, the present invention also relates to the use of the new thermotropic polyesters for the production of moldings, filaments, fibers and films.

EXAMPLES

In the following Examples, all percentages are by weight.

Notched impact strength (ak) was tested on small test specimens in accordance with DIN 53 453 (ISO/R 179) at a temperature of 23° C. (10 test specimens were used for each test). The modulus of elasticity in tension was measured in accordance with DIN 53 455 (ISO/R 527).

EXAMPLE 1

The following substances were weighed into a nitrogen-purged, thoroughly heated melt condensation reactor consisting of a 1 liter face-ground vessel with a face-ground cover, stirrer, nitrogen inlet and distillation column:
220.17 g=1.59 mol p-hydroxybenzoic acid
63.60 g=0.34 mol 4,4,-dihydroxydiphenyl
106.04 g=0.34 mol 1,1-bis-(4-hydroxyphenyl)-3,3,5-trimethyl cyclohexane
56.75 g=0.34 mol terephthalic acid
56.75 g=0.34 mol. isophthalic acid
308.44 g=3.02 mol acetic anhydride
0.05 g germanium dioxide
0.23 g hydroquinone sulfonic acid, K salt
The reaction mixture was heated by oil bath to 200° C. in a gentle stream of nitrogen. The temperature was increased to 230° C. over a period of 1 hour. Acetic acid distilled off. The temperature was increased to 300° C. over another 2 hours, more acetic acid distilling off. After 0.5 hour, the elimination of acetic acid was completed by reducing the pressure to 12 mbar and increasing the temperature to 320.C over a period of 1 hour. A beige-colored polyester was obtained after cooling (distillate yield: 288.g=96.0% of the theoretical). The HDT-A was 212° C.

EXAMPLE 2

Comparison Example

The following substances were weighed into a nitrogen-purged, thoroughly heated melt condensation reactor consisting of a 1 liter face-ground vessel with a face-ground cover, stirrer, nitrogen inlet and distillation column:
234.87 g=1.70 mol p-hydroxybenzoic acid
67.85 g=0.36 mol 4,4,-dihydroxydiphenyl
83.08 g=0.36 mol bisphenol-A
60.54 g=0.36 mol terephthalic acid
60.54 g=0.36 mol isophthalic acid
328.64 g=3.21 mol acetic anhydride
0.05 g germanium dioxide
0.26 g hydroquinone sulfonic acid, K salt.
The reaction mixture was heated by oil bath to 200° C. in a gentle stream of nitrogen. The temperature was increased to 230° C. over a period of 1 hour. Acetic acid distilled off. The temperature was increased to 300° C. over another 2 hours, more acetic acid distilling off. After 0.5 hour, the elimination of acetic acid was completed by reducing the pressure to 12 mbar and increasing the temperature to 320° C. over a period of I hour. A beige-colored polyester was obtained after cooling (distillate yield: 288.g=96.0% of the theoretical). The HDT-A was 151° C.

The Comparison Example shows that polyesters containing residues of the new bisphenols (in Example 1: 1,1-bis-(4-hydroxyphenyl)-3,3,5-trimethyl cyclohexane) in co-condensed form, have considerably higher heat resistance than fully aromatic thermotropic polyesters or thermotropic polyesters containing co-condensed residues of other prescribed bisphenols (in Example 2: 2,2-bis-(4-hydroxyphenyl)-propane).

We claim:

1. Thermotropic aromatic polyester containing recurring units corresponding to the following formulae

and

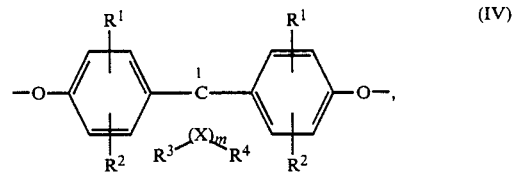

in which
Ar$^1$, Ar$^2$ and Ar$^3$ represent difunctional aromatic radicals containing 6 to 18 carbon atoms, these radicals optionally being substituted by 1 to 4 alkyl groups, 1 to 4 C$_{1-4}$ alkoxy groups, by 1 to 4 halogen atoms and
R$^1$ and R$^2$ independently of one another represent hydrogen, halogen, C$_{1-8}$ alkyl, C$_{5-6}$ cycloalkyl, C$_{6-10}$ aryl or C$_{7-12}$ aralkyl,
m is an integer of 4 to 7, $R^3$ and $R^4$ represent individually selected for each X and, independently of one another, represent hydrogen or $C_1$–$C_6$ alkyl and X represents carbon, with the proviso that at least one ring carbon atom is substituted simultaneously by two $C_{1-6}$ alkyl radicals, the molar ratio of the recurring units (I):(II) being 20 to 85:80 to 15, the molar ratio (II):(III) and (IV) being 1 to 0.95:1 to 1.05 and the molar ratio (III):(IV) being 20 to 98:80 to 2.

2. Thermotropic aromatic polyesters as claimed in claim 1, characterized in that the molar ratio of the recurring units (I):(II) is 50 to 80:20 to 50.

3. Thermotropic aromatic polyesters as claimed in claim 1, characterized in that the molar ratio of the recurring units (II):(III) and (IV) is 1 to 0.98:1 to 1.02.

4. Thermotropic aromatic polyesters as claimed in claim 1, characterized in that the molar ratio of the recurring units (III):(IV) is 25 to 95:75 to 5.

5. The molding, filament, fiber or film comprising the thermotropic aromatic polyester of claim 1.

* * * * *